US009241550B2

(12) United States Patent
James et al.

(10) Patent No.: US 9,241,550 B2
(45) Date of Patent: Jan. 26, 2016

(54) PORTABLE CARRIER FOR REUSABLE GROCERY-STYLE BAGS

(71) Applicants: Gregory D. James, Austin, TX (US); Scott A. Chadwell, Houston, TX (US)

(72) Inventors: Gregory D. James, Austin, TX (US); Scott A. Chadwell, Houston, TX (US)

(73) Assignee: BALANCED EARTH SOLUTIONS, LLC, Austin, TX (US)

( * ) Notice: Subject to any disclaimer, the term of this patent is extended or adjusted under 35 U.S.C. 154(b) by 30 days.

(21) Appl. No.: 14/018,407

(22) Filed: Sep. 4, 2013

(65) Prior Publication Data

US 2015/0060504 A1  Mar. 5, 2015

(51) Int. Cl.
*A45F 5/00* (2006.01)
*A45C 3/04* (2006.01)
*A45C 3/00* (2006.01)
*A45F 5/02* (2006.01)
*A45C 11/00* (2006.01)

(52) U.S. Cl.
CPC . *A45C 3/00* (2013.01); *A45C 11/00* (2013.01); *A45F 5/00* (2013.01); *A45F 5/021* (2013.01); *A45C 3/04* (2013.01); *A45F 2005/006* (2013.01); *A45F 2200/05* (2013.01); *Y02W 30/807* (2015.05); *Y10S 224/925* (2013.01)

(58) Field of Classification Search
CPC .......... A45C 3/04; A45F 5/02; Y10S 224/925
USPC ....................................................... 224/925
See application file for complete search history.

(56) References Cited

U.S. PATENT DOCUMENTS

| 1,269,276 | A | * | 6/1918  | Harris ................................ 383/4 |
|-----------|---|---|---------|----------------------------------------------|
| 4,739,880 | A | * | 4/1988  | Sawyer et al. ................. 206/223 |
| 4,793,532 | A | * | 12/1988 | Cash ............................. 224/584 |
| 5,007,250 | A | * | 4/1991  | Musielak ........................ 62/372 |
| 5,042,687 | A | * | 8/1991  | McKinley ....................... 221/311 |
| 5,046,860 | A | * | 9/1991  | Brennan ......................... 383/38 |
| D332,696  | S | * | 1/1993  | Kendrick ........................ D3/243 |
| D334,660  | S | * | 4/1993  | Zagora et al. .................. D3/287 |
| 5,209,385 | A | * | 5/1993  | Ledesma ....................... 224/681 |
| 5,285,927 | A | * | 2/1994  | Pruitt ............................... 221/22 |
| 5,297,872 | A | * | 3/1994  | Caligiuri ........................ 383/86 |
| 5,341,928 | A | * | 8/1994  | Jones et al. ................. 206/315.5 |
| 5,341,933 | A | * | 8/1994  | Willows ........................ 206/554 |
| D355,300  | S | * | 2/1995  | Smith et al. .................... D3/287 |
| 5,427,453 | A |   | 6/1995  | Cloessner |
| 5,451,108 | A | * | 9/1995  | Anderson ....................... 383/38 |
| D369,467  | S | * | 5/1996  | Cole .............................. D3/300 |
| 5,615,769 | A | * | 4/1997  | Stephenson ................. 206/315.9 |
| 5,641,103 | A | * | 6/1997  | Potik et al. .................... 224/251 |
| 5,692,836 | A | * | 12/1997 | Mitchell ........................ 383/40 |

(Continued)

OTHER PUBLICATIONS

International Search Report of the International Searching Authority (USPTO) for international application PCT/US2014/050459 dated Nov. 18, 2014.

(Continued)

*Primary Examiner* — Justin Larson
(74) *Attorney, Agent, or Firm* — Basil M. Angelo

(57) ABSTRACT

A portable carrier includes a sleeve including a cavity, a dispensing port disposed along a length of the sleeve, and a loading port disposed on a first distal end of the sleeve. The loading port is configured to load a plurality of reusable bags into the cavity of the sleeve. The cavity of the sleeve is configured to store a plurality of reusable bags. The dispensing port is configured to provide access to one or more reusable bags from the cavity of the sleeve.

17 Claims, 6 Drawing Sheets

(56) References Cited

U.S. PATENT DOCUMENTS

| | | | |
|---|---|---|---|
| 5,772,090 A * | 6/1998 | Rodriguez | 224/251 |
| 5,839,631 A * | 11/1998 | Hebert et al. | 224/251 |
| 5,947,277 A * | 9/1999 | Sherman | 206/216 |
| 5,988,468 A * | 11/1999 | Murdoch et al. | 224/237 |
| 6,012,843 A * | 1/2000 | Brooks et al. | 383/37 |
| 6,085,695 A * | 7/2000 | Miller et al. | 119/795 |
| 6,190,045 B1 * | 2/2001 | Schulman | 383/24 |
| D453,876 S * | 2/2002 | Moor et al. | D3/300 |
| 6,357,586 B2 * | 3/2002 | Pratt et al. | 206/315.9 |
| D468,905 S * | 1/2003 | Nevins | D3/246 |
| D494,366 S * | 8/2004 | Gognat et al. | D3/300 |
| D636,597 S * | 4/2011 | McCabe | D3/267 |
| 8,287,188 B2 * | 10/2012 | Hoyord et al. | 383/4 |
| 8,646,605 B2 * | 2/2014 | Zimmerman | 206/440 |
| 8,827,105 B1 * | 9/2014 | Shiek | 220/676 |
| 2007/0235492 A1 * | 10/2007 | Sirichai et al. | 224/930 |
| 2008/0267540 A1 * | 10/2008 | Ashworth | 383/81 |
| 2009/0314678 A1 * | 12/2009 | Stein | 206/494 |
| 2011/0185476 A1 * | 8/2011 | Boisseau et al. | 2/243.1 |
| 2012/0241463 A1 | 9/2012 | Zimmerman | |
| 2014/0203055 A1 * | 7/2014 | Salinas | 224/486 |
| 2015/0020935 A1 * | 1/2015 | Condon et al. | 150/106 |

OTHER PUBLICATIONS

Written Opinion of the International Searching Authority (USPTO) for international application PCT/US2014/050459 dated Nov. 18, 2014.

* cited by examiner

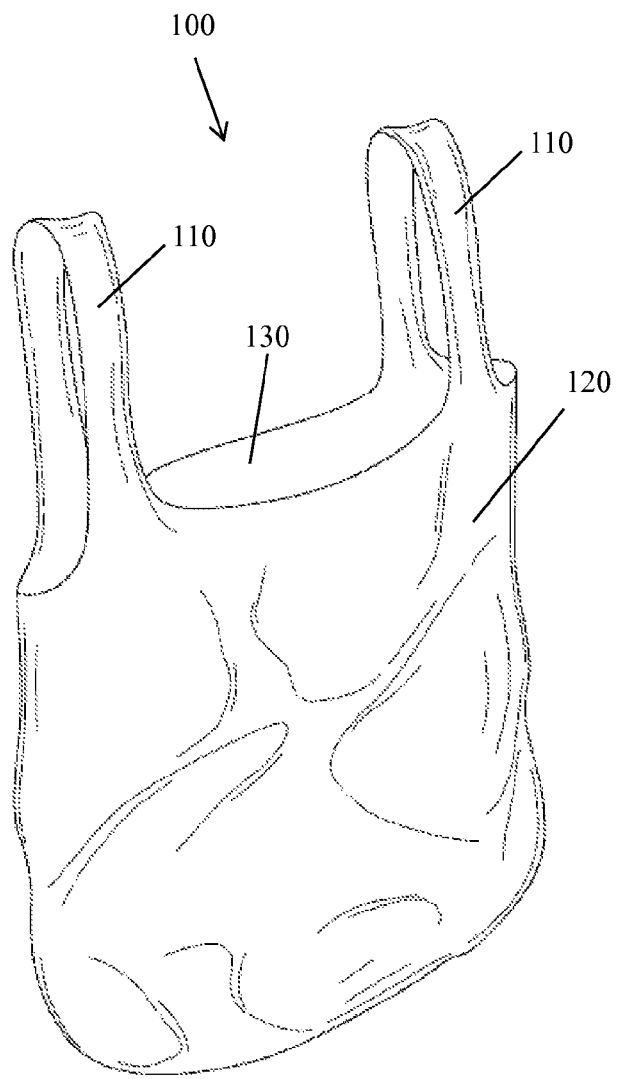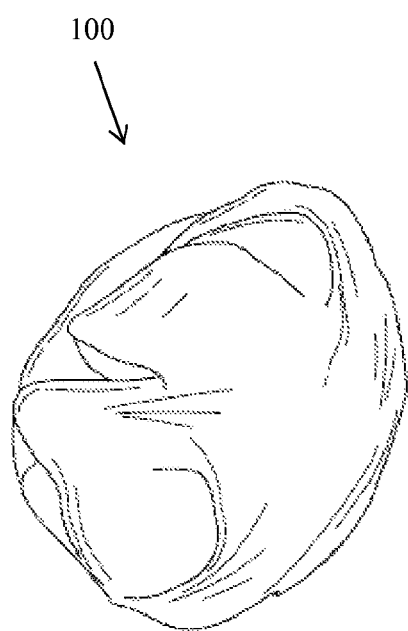
FIG. 1A
FIG. 1B
FIG. 1

PORTABLE CARRIER FOR REUSABLE GROCERY-STYLE BAGS

BACKGROUND OF THE INVENTION

Single-use grocery-style bags are commonly used to transport various goods. Conventional single-use grocery-style bags include single-use paper bags and single-use plastic bags. Single-use paper bags are typically made of wood pulp sourced from trees or recycled materials. Wood pulp sourced from trees is typically preferred to wood pulp sourced from recycled materials because of its comparatively greater strength and ultimate carrying capacity. However, sourcing wood pulp from trees is time consuming because of the long drying period required. In addition, while source trees are a renewable resource that can be replenished, the demand for single-use grocery-style bags makes replenishment impracticable. As a consequence, single-use paper bags have largely given way to single-use plastic bags.

Single-use plastic bags are typically made of polyethylene sourced from petroleum or petroleum byproducts. While source petroleum is readily available today, it is a non-renewable resource that cannot be replenished. Yet, the demand for single-use plastic bags is nothing short of extraordinary. In the United States, approximately 100 billion single-use plastic bags are used and discarded every year. Worldwide, approximately 1 trillion single-use plastic bags are used and discarded every year.

From an environmental perspective, the accumulation of discarded single-use plastic bags presents a number of challenges. According to a United Nations Environment Programme study, approximately 10 percent of the single-use plastic bags made each year end up in the ocean. Approximately 70 percent of those single-use plastic bags that end up in the ocean make their way to the ocean floor, where conditions are such that they prevent the single-use plastic bags from biodegrading. Even if single-use plastic bags are discarded in conditions suitable for biodegrading, they can take up to 1000 years to fully degrade and the process can produce toxic chemicals that may enter and contaminate the food chain or water supply.

BRIEF SUMMARY OF THE INVENTION

According to one aspect of one or more embodiments of the present invention, a portable carrier includes a sleeve comprising a cavity, a dispensing port disposed along a length of the sleeve, and a loading port disposed on a first distal end of the sleeve.

Other aspects of the present invention will be apparent from the following description and claims.

BRIEF DESCRIPTION OF THE DRAWINGS

FIG. 1 shows a reusable bag in accordance with one or more embodiments of the present invention.

DETAILED DESCRIPTION OF THE INVENTION

Figure 2:
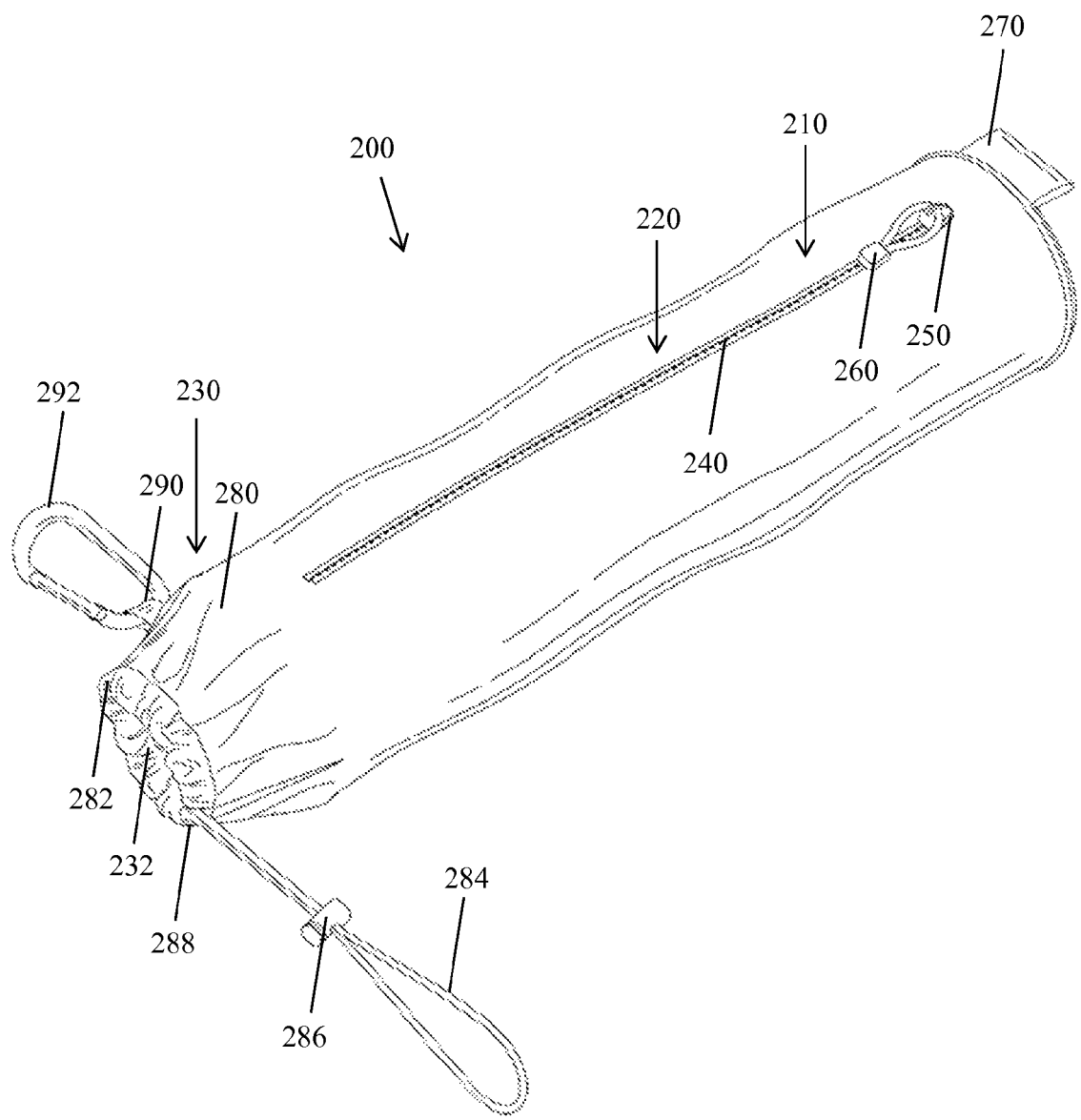
FIG. 2 shows a front perspective view of a portable carrier for reusable grocery-style bags in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

In recent years, there has been a growing recognition of the environmental impact of single-use plastic bags. As a consequence, a number of efforts have been undertaken to reduce or eliminate their use. In some municipalities, local governments have banned single-use plastic bags that use lead-based colored inks. In other municipalities, local governments have banned single-use plastic bags outright. For example, the city of Los Angeles recently joined San Francisco, Seattle and others in banning the use of single-use plastic bags. In Hawaii, all five counties have joined together to ban the use of single-use plastic bags, effectively making Hawaii the first state to ban their use statewide.

While many municipalities still permit the use of single-use plastic bags, the trend is towards obsolescence. Some municipalities have even imposed a tax on consumers of single-use plastic bags at the point of purchase as a means of encouraging the use of reusable bags. For these and other reasons, single-use plastic bags have and will continue to give way to the growing use of reusable bags to transport goods.

FIG. 1 shows a reusable bag 100 in accordance with one or more embodiments of the present invention. A reusable bag 100 may be used to transport one or more goods (not shown). In FIG. 1A, reusable bag 100 includes a plurality of carrying loops 110, a storage area 120, and an opening 130 that provides access to storage area 120. In certain embodiments, reusable bag 100 may have a shape and size substantially similar to standard single-use plastic bags commonly used in grocery and retail stores. This standard shape and size has proven effective at preventing overloading, encourages the separation of items by temperature, weight, and durability, and encourages the separation of raw meats from other items to prevent the spread of foodborne illnesses. In addition, this standard shape and size facilitates the use of already existing bag holders that hold single-use plastic grocery bags open at a point of purchase for loading. In other embodiments, reusable bag 100 may have a shape that differs from standard single-use plastic bags. In still other embodiments, reusable bag 100 may have a size that differs from standard single-use plastic bags. One of ordinary skill in the art will recognize that the shape and/or the size of reusable bag 100 may vary based on an application or design in accordance with one or more embodiments of the present invention.

When reusable bags 100 are used to carry perishable goods, such as groceries, they are typically washed at a regular interval to prevent the spread of foodborne illness. As such, reusable bag 100 may be made of a durable material capable of withstanding repeated cleaning. In certain embodiments, reusable bag 100 may comprise ripstop nylon. In other embodiments, reusable bag 100 may comprise polyester. In still other embodiments, reusable bag 100 may comprise nylon, antibacterial polyester, cotton, hemp, or jute. One of ordinary skill in the art will recognize that the composition of reusable bag 100 may vary based on an application or design in accordance with one or more embodiments of the present invention. In certain embodiments, reusable bag 100 may be decorated with an ornamental design printed on the material of reusable bag 100 itself. As depicted in FIG. 1B, reusable bag 100 may be folded or crumpled to facilitate storage and transport.

FIG. 2 shows a front perspective view of a portable carrier 200 for reusable grocery-style bags (100 of FIG. 1) in accordance with one or more embodiments of the present invention. A portable carrier for reusable grocery-style bags 200 may include a sleeve 210, a dispensing port 220 disposed along a length of sleeve 210, and a loading port 230 disposed on a first distal end of sleeve 210.

In certain embodiments, sleeve 210 may be flexible. In other embodiments, sleeve 210 may be substantially rigid. One of ordinary skill in the art will recognize that the flexibility or rigidity of sleeve 210 may vary based on an application or design in accordance with one or more embodiments of the present invention. In certain embodiments, sleeve 210 may be substantially cylindrical in shape. In other embodiments, sleeve 210 may be substantially rectangular in shape. In still other embodiments, sleeve 210 may be substantially triangular in shape. In still other embodiments sleeve 210 may be substantially polygonal in shape. One of ordinary skill in the art will recognize that the shape of sleeve 210 may vary based on an application or design in accordance with one or more embodiments of the present invention.

In certain embodiments, sleeve 210 may be of a size suitable to accommodate a predetermined number of reusable bags (100 of FIG. 1) that each have a shape and size substantially similar to standard single-use plastic bags commonly used in grocery and retail stores. In other embodiments, sleeve 210 may be of a size suitable to accommodate a predetermined number of reusable bags (100 of FIG. 1) that have a shape or size that differs from standard single-use plastic bags. One of ordinary skill in the art will recognize that the size of sleeve 210 may vary based on an application or design in accordance with one or more embodiments of the present invention.

Sleeve 210 may comprise a synthetic fabric or material, an organic fabric or material, or a combination of one or more synthetic fabrics or materials and/or one or more organic fabrics or materials. In certain embodiments, sleeve 210 may comprise a fabric such as, for example, nylon, ripstop nylon, spandex, and/or elastane. In other embodiments, sleeve 210 may comprise organic or natural fabrics, leather, and/or suede. In still other embodiments, sleeve 210 may comprise a plastic or silicone material. One of ordinary skill in the art will recognize that the composition of sleeve 210 may vary based on an application or design in accordance with one or more embodiments of the present invention.

In certain embodiments, sleeve 210 may comprise a breathable fabric or material that allows air to permeate the cavity (not shown) of sleeve 210. In this way, reusable bags (100 of FIG. 1) disposed within the cavity (not shown) of sleeve 210 may air out and dry. In other embodiments, only a portion of sleeve 210 may comprise a breathable fabric or material. In still other embodiments, a limited portion of sleeve 210, on the opposite side of zipper 240, may comprise a breathable fabric or material. In certain embodiments, the breathable fabric or material (not shown) may be a material that wicks away moisture from the interior of sleeve 210. In other embodiments, the breathable fabric or material (not shown) may be a breathable membrane that permits airflow between the interior and exterior of sleeve 210. In still other embodiments, the breathable fabric or material (not shown) may be a mesh-type material that promotes air flow between the interior and exterior of sleeve 210. One of ordinary skill in the art will recognize that the type of breathable fabric or material may vary based on an application or design in accordance with one or more embodiments of the present invention.

In certain embodiments, depending on the materials used, sleeve 210 may be water resistant or waterproof because of its composition. In other embodiments, sleeve 210 may be coated with a coating to make it water resistant or waterproof. In still other embodiments, sleeve 210 may not be waterproof. In certain embodiments, sleeve 210 may be decorated with an ornamental design printed on the fabric of sleeve 210 itself. In other embodiments, sleeve 210 may be decorated with ornamental treatments attached to the exterior of sleeve 210. One of ordinary skill in the art will recognize that the ornamental design of sleeve 210 may vary based on an application or design in accordance with one or more embodiments of the present invention.

Sleeve 210 includes a closable opening on the first distal end that provides access to a cavity (not shown) of sleeve 210. The cavity (not shown) may be configured for storing a plurality of reusable bags (100 of FIG. 1B). Dispensing port 220 may be configured to provide access to one or more reusable bags (100 of FIG. 1) stored in the cavity (not shown) of sleeve 210 when their use is desired, such as at a retail point of purchase. A second distal end of sleeve 210 may be closed such that the cavity (not shown) of sleeve 210 may only be accessed via the opening on the first distal end or the dispensing port 220. In certain embodiments, dispensing port 220 may comprise a zipper 240 disposed along a length of sleeve 210, a slider 250 disposed on zipper 240, and a pull tab 260 disposed on slider 250 to facilitate zipping and unzipping zipper 240. In certain embodiments, slider 250 may include a fabric flap or shield (not shown) that prevents reusable bags (100 of FIG. 1) disposed within the cavity (not shown) from getting caught in slider 250.

A fabric loop 270 may optionally be disposed on a second distal end of sleeve 210, the end furthest from loading port 230. Fabric loop 270 may provide branding and/or composition information relating to portable carrier 200 and other relevant information. Fabric loop 270 may also serve as a grab point so that a user may secure portable carrier 200 in place when unzipping zipper 240 by pulling pull tab 260 towards the loading port 230. When sufficiently unzipped, zipper 240 may provide access to the cavity (not shown) of sleeve 210 and its contents. In this way, a user may remove one or more reusable bags (100 of FIG. 1) for use as needed. In other embodiments, dispensing port 220 may comprise a hook-and-loop fastener (not shown), buttons and button fasteners (not shown), or any other type of fasteners (not shown). One or ordinary skill in the art will recognize that the type of opening and closing structure of dispensing port 220 may vary based on an application or design in accordance with one or more embodiments of the present invention.

Loading port 230 may be configured to load one or more reusable bags (100 of FIG. 1B) into the cavity (not shown) of sleeve 210 through a mouth 232 that opens into the first distal end of sleeve 210. In certain embodiments, loading port 230 may include a flexible fabric 280 attached to an opening of the first distal end of sleeve 210, the opening providing distal access to the cavity (not shown) of sleeve 210. In other embodiments, flexible fabric 280 may be a continuous extension of sleeve 210, comprised of the same material and cut.

Loading port 230 may include a cord fabric loop 282, attached to, or formed out of, flexible fabric 280. A rope-style cord loop 284 may be partially disposed within cord fabric loop 282 with a remaining portion of cord loop 284 configured to serve as a carrying handle. A cord lock 286, disposed around cord loop 284, may be configured to cinch loading port 230 closed or uncinch loading port 230 so that mouth 232 is accessible. In FIG. 2, loading port 230 is shown cinched closed. A fabric gusset 288 may optionally be included to provide additional give to the opening of mouth 232. In other embodiments, loading port 230 may be a zippered closure (not shown) that runs along a circumference or perimeter of mouth 232, as the case may be. In still other embodiments, loading port 230 may be a hook-and-loop fastener (not shown), buttons and button fasteners (not shown), or any other type of fastener (not shown). One of ordinary skill in the art will recognize that the opening and closing mechanism of loading port 230 may vary in accordance with one or more embodiments of the present invention.

Loading port 230 may comprise a synthetic fabric or material, an organic fabric or material, or a combination of one or more synthetic fabrics or materials and/or one or more organic fabrics or materials. In certain embodiments, loading port 230 may comprise a fabric such as, for example, nylon, ripstop nylon, spandex, or elastane. In other embodiments, loading port 230 may comprise organic or natural fabrics, leather, or suede. In still other embodiments, loading port 230 may comprise a plastic or silicone material. One of ordinary skill in the art will recognize that the composition of loading port 230 may vary based on an application or design in accordance with one or more embodiments of the present invention.

In certain embodiments, loading port 230 may comprise a breathable fabric or material that allows air to permeate the cavity (not shown) of sleeve 210. In this way, reusable bags (100 of FIG. 1) disposed within the cavity (not shown) of sleeve 210 may air out and dry. In other embodiments, only a portion of loading port 230 may comprise a breathable fabric or material. In certain embodiments, the breathable fabric or material (not shown) may be a material that wicks away moisture from the interior of sleeve 210. In other embodiments, the breathable fabric or material (not shown) may be a breathable membrane that permits airflow between the cavity and exterior of sleeve 210. In still other embodiments, the breathable fabric or material (not shown) may be a mesh-type material that promotes air flow. One of ordinary skill in the art will recognize that the type of breathable fabric or material may vary based on an application or design in accordance with one or more embodiments of the present invention.

In certain embodiments, depending on the materials used, loading port 230 may be water resistant or waterproof because of its composition. In other embodiments, loading port 230 may be coated with a coating to make it water resistant or waterproof. In still other embodiments, loading port 230 may not be waterproof. In certain embodiments, loading port 230 may be decorated with an ornamental design printed on the fabric of loading port 230 itself. In other embodiments, loading port 230 may be decorated with ornamental treatments attached to the exterior of loading port 230. One of ordinary skill in the art will recognize that the ornamental design of loading port 230 may vary based on an application or design in accordance with one or more embodiments of the present invention.

Portable carrier 200 may include a carabiner fabric loop 290 disposed on sleeve 210. In certain embodiments, carabiner fabric loop 290 may be disposed on sleeve 210 nearest mouth 232. In other embodiments, carabiner fabric loop 290 may be disposed on sleeve 210 in between mouth 232 and zipper 240. One of ordinary skill in the art will recognize that the location of carabiner fabric loop 290 may vary based on an application or design in accordance with one or more embodiments of the present invention. In certain embodiments, a carabiner 292 may be attached to carabiner fabric loop 290. A user may use carabiner 292 to clip portable carrier 200 to a grocery basket, cart, or other point of attachment. In addition, carabiner 292 may serve as grab point when zipping zipper 240 closed. One of ordinary skill in the art will recognize that other attachment or clipping mechanisms may be used instead of a carabiner in accordance with one or more embodiments of the present invention.

Figure 3:
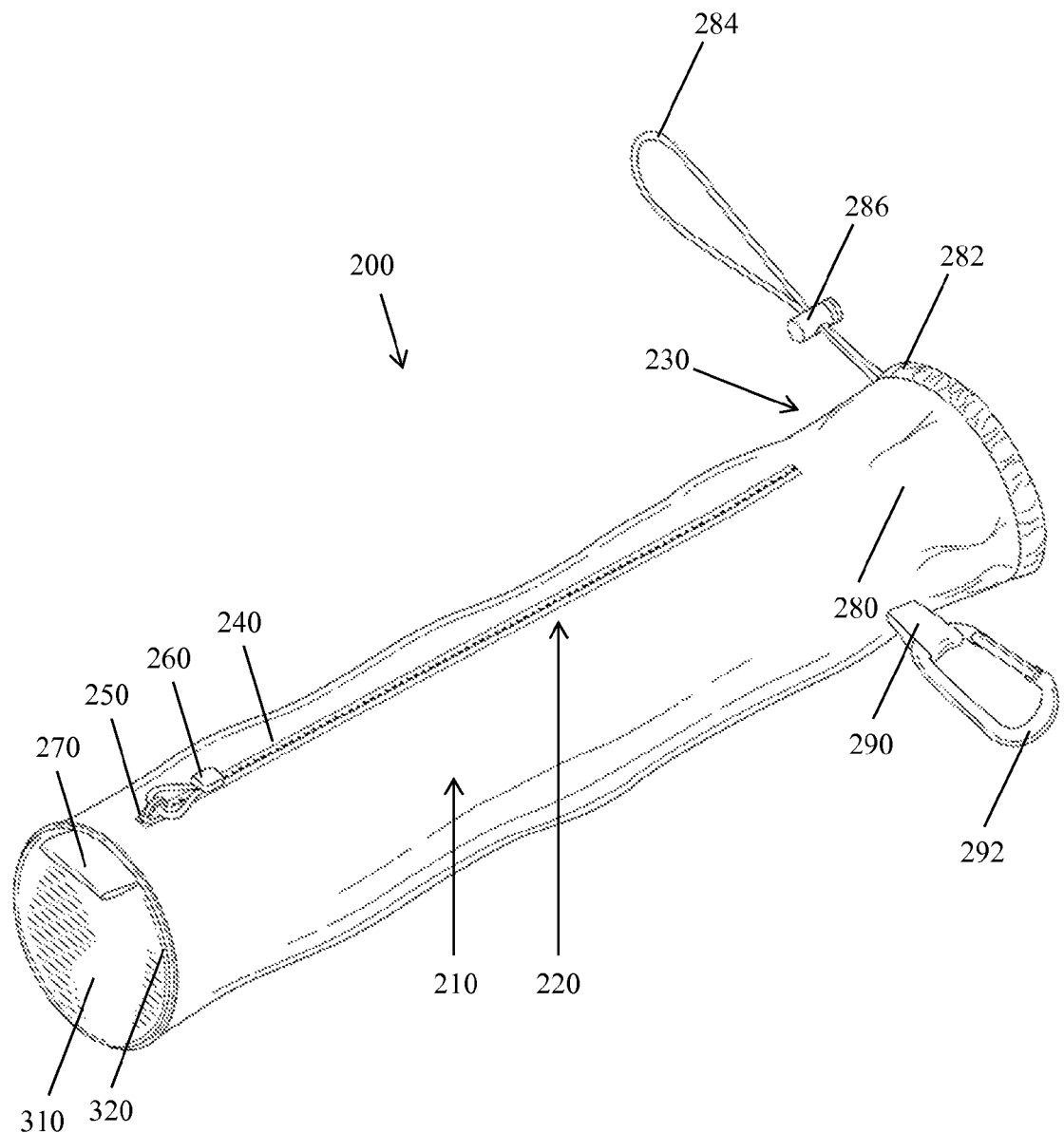
FIG. 3 shows a rear perspective view of a portable carrier for reusable grocery-style bags in accordance with one or more embodiments of the present invention.

FIG. 3 shows a rear perspective view of a portable carrier 200 for reusable bags (100 of FIG. 1) in accordance with one or more embodiments of the present invention. Sleeve 210 includes a back portion 310 closing the second distal end of sleeve 210. Back portion 310 may also assist in maintaining the shape of sleeve 210. In certain embodiments, back portion 310 may be composed of the same material as sleeve 210. In other embodiments, back portion 310 may be composed of a different material than sleeve 210. In certain embodiments, back portion 310 may be a continuous extension of sleeve 210. In other embodiments, back portion 310 may be a separate piece of material attached to sleeve 210. In certain embodiments, piping 320 may optionally be sewn into the end where back portion 310 meets sleeve 210 to assist sleeve 210 maintain shape. In other embodiments, piping 320 may not be necessary because the material composition of sleeve 210 maintains shape.

Figure 4:
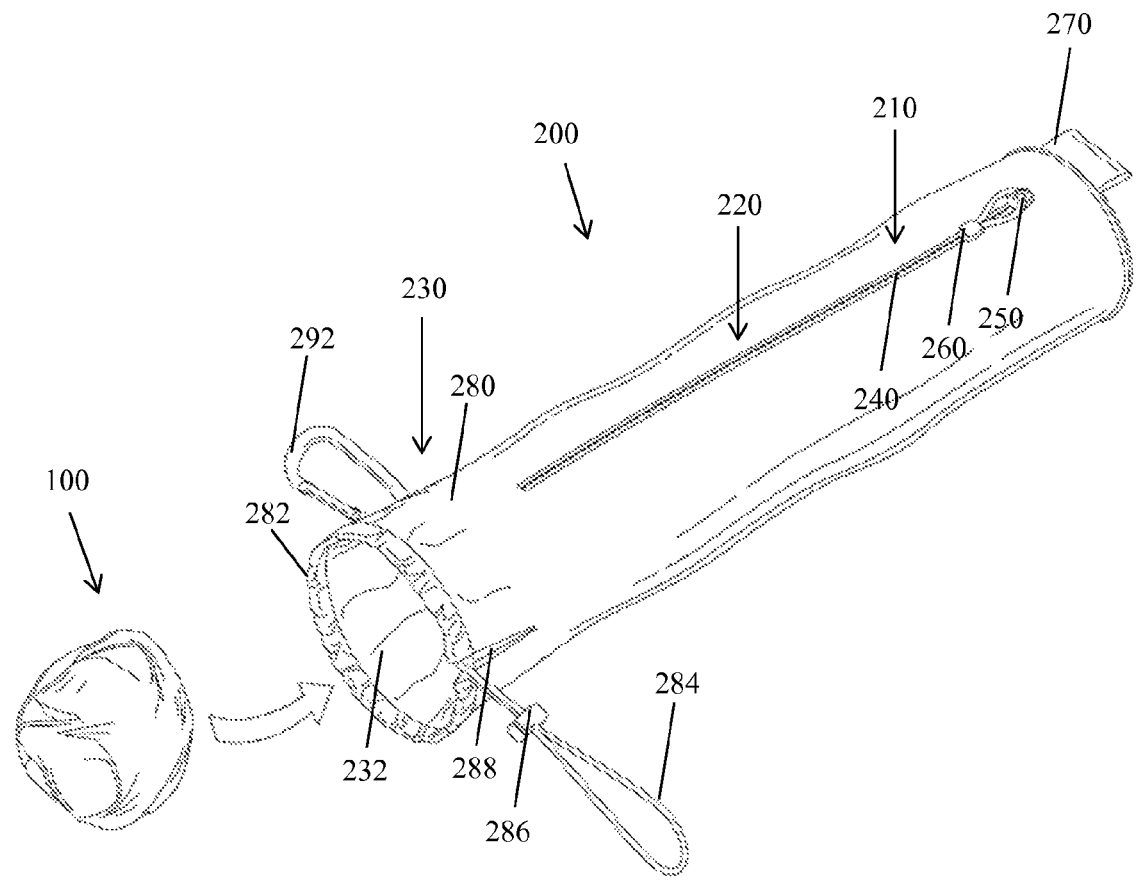
FIG. 4 shows a reusable bag being inserted into a portable carrier for reusable grocery-style bags in accordance with one or more embodiments of the present invention.

FIG. 4 shows a reusable bag 100 being inserted into a portable carrier 200 for reusable bags 100 in accordance with one or more embodiments of the present invention. In FIG. 4, loading port 230 is depicted uncinched and mouth 232 is open, ready to be loaded with one or more reusable bags 100. Loading port 230 may be uncinched by depressing cord lock 286 and opening mouth 232 by expanding cord fabric loop 282 around a larger portion of cord loop 284. In certain embodiments, a fabric gusset 288 may allow mouth 232 to open wider than it otherwise would. Reusable bag 100 may be folded or crumpled. Once folded or crumpled, reusable bag 100 may be inserted into mouth 232 and into the cavity (not shown) of sleeve 210. A plurality of reusable bags 100 may be in inserted into the cavity (not shown) of sleeve 210 in this manner, one at a time. Each subsequently inserted bag 100 pushes the prior inserted bags 100 towards the back portion (310 of FIG. 3) of the second distal end of sleeve 210.

Figure 5:
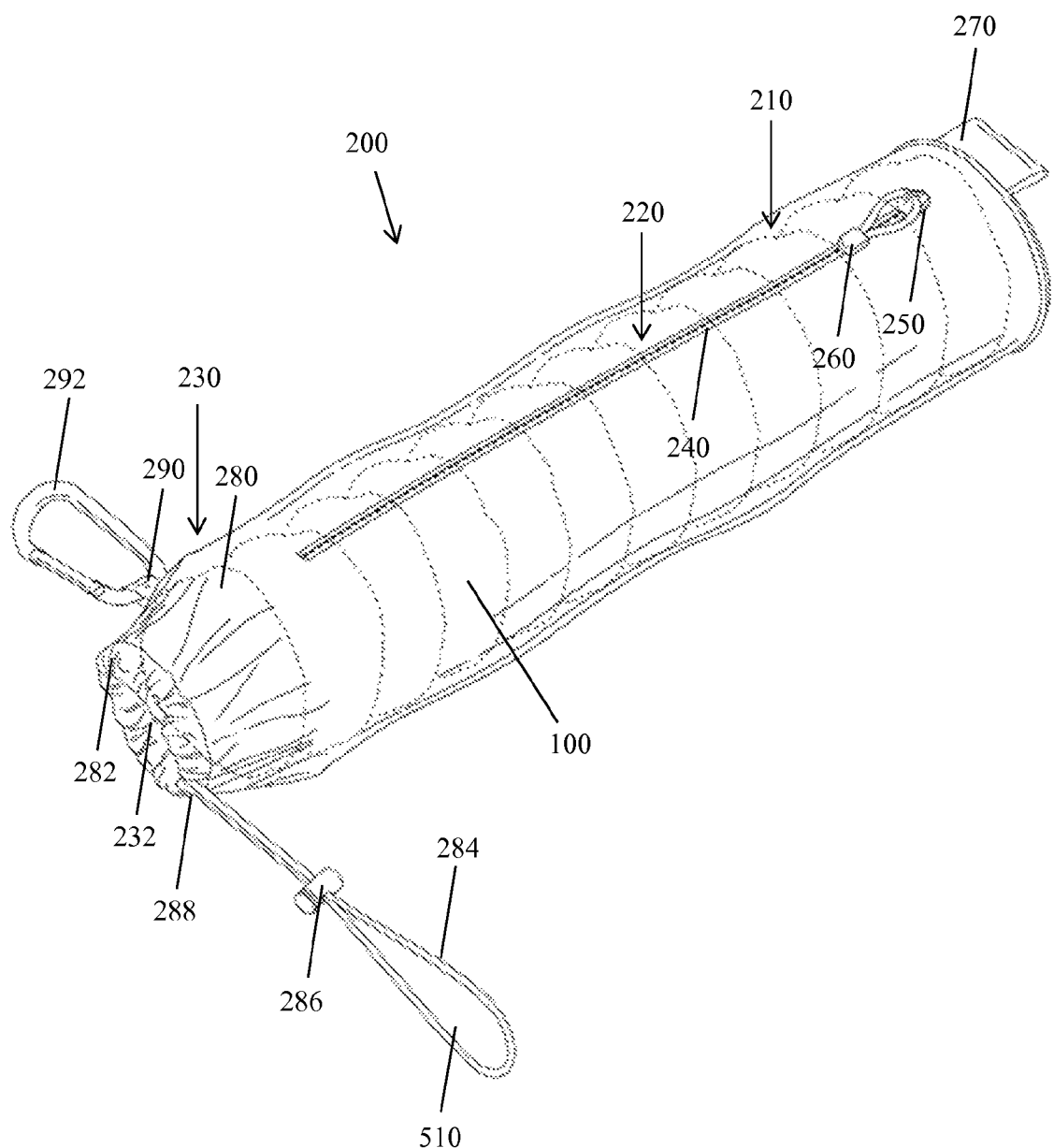
FIG. 5 shows a portable carrier for reusable grocery-style bags loaded with a plurality of reusable bags in accordance with one or more embodiments of the present invention.

FIG. 5 shows a portable carrier 200 for reusable bags 100 loaded with a plurality of reusable bags 100 in accordance with one or more embodiments of the present invention. In FIG. 5, twelve folded or crumpled reusable bags 100s are depicted stored in the cavity (not independently illustrated) of sleeve 210. In certain embodiments, portable carrier 200 may be sized such that it can carry in a range between two and twenty folded or crumpled reusable bags 100 that are substantially similar in shape and size to standard single-use plastic bags. In other embodiments, portable carrier 200 may be sized such that it can carry in a range between two and twenty folded or crumpled reusable bags 100 that are larger than standard single-use plastic bags. In still other embodiments, portable carrier 200 may be sized to carry a predetermined number of reusable bags 100 that may or may not be standard shape or size. One of ordinary skill in the art will recognize that the size of portable carrier 200 and the number of reusable bags 100 that it carries may vary based on an application or design in accordance with one or more embodiments of the present invention.

In FIG. 5, dispensing port 220 is depicted as zippered closed and loading port 230 is depicted as cinched closed. Loading port 230 may be cinched by depressing cord lock 286 and pulling cord loop 284 such that cord fabric loop 282 closes mouth 232. In this way, portable carrier 200 is depicted fully loaded and ready to store or transport the plurality of reusable bags 100. When loaded, portable carrier 200 may be used to store and protect the plurality of reusable bags 100 until they are needed. When a user anticipates the need for reusable bags 100, portable carrier 200 may be taken to a point of purchase. Portable carrier 200 may be carried by carrying handle 510 formed by cord loop 284. Carrying handle 510 may be used to attach portable carrier 200 to a basket, cart, or other point of attachment. Alternatively, carabiner 292 may be used to attach portable carrier 200 to a basket, cart, or other point of attachment, thereby freeing the hands of the user.

Figure 6:
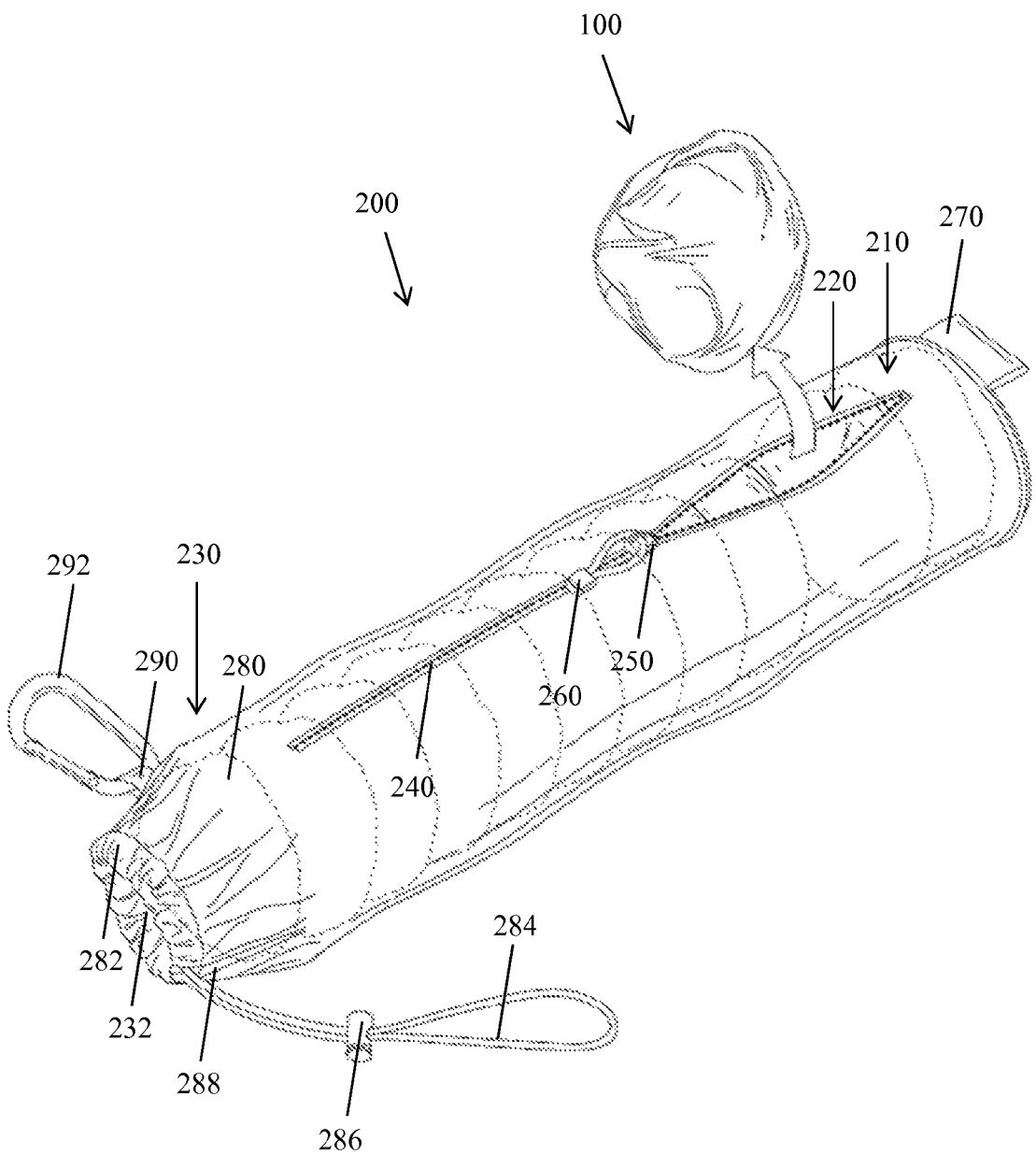
FIG. 6 shows a reusable bag being removed from a portable carrier for reusable grocery-style bags in accordance with one or more embodiments of the present invention.

FIG. 6 shows a reusable bag 100 being removed from a portable carrier 200 for reusable bags 100 in accordance with one or more embodiments of the present invention. When one or more reusable bags 100 are required, a user may open dispensing port 220 and remove one or more reusable bags 100. In certain embodiments that include fabric loop 270, a user may grab fabric loop 270 to secure portable carrier 200 in place and unzip zipper 240 by pulling pull tab 260 towards loading port 230. When sufficiently unzipped, zipper 240 may provide access to the cavity (not independently illustrated) of sleeve 210 and its contents, in this instance, reusable bags 100. In this way, the user may remove one or more reusable bags 100 for use as needed (as few or as many as the case may be).

Advantages of one or more embodiments of the present invention may include one or more of the following:

In one or more embodiments of the present invention, a portable carrier for reusable grocery-style bags provides simple and easy access to one or more reusable grocery-style bags stored within the carrier at a point of purchase.

In one or more embodiments of the present invention, a portable carrier for reusable grocery-style bags encourages the use of environmentally responsible reusable grocery-style bags.

In one or more embodiments of the present invention, a portable carrier for reusable grocery-style bags reduces or eliminates the need for single-use paper bags or single-use plastic bags.

In one or more embodiments of the present invention, a portable carrier for reusable grocery-style bags compactly stores, protects, and transports a plurality of reusable grocery-style bags.

In one or more embodiments of the present invention, a portable carrier for reusable grocery-style bags compactly stores a plurality of reusable grocery-style bags in a small footprint.

In one or more embodiments of the present invention, a portable carrier for reusable grocery-style bags, even when fully loaded, is more compact and easily transportable than bulky reusable bags typically stored individually.

In one or more embodiments of the present invention, a portable carrier for reusable grocery-style bags protects a plurality of reusable grocery-style bags from rain or moisture.

In one or more embodiments of the present invention, a portable carrier for reusable grocery-style bags transports a plurality of reusable grocery-style bags in an organized manner.

In one or more embodiments of the present invention, a portable carrier for reusable grocery-style bags includes a loading port that facilitates loading, unloading, and reloading reusable grocery-style bags into the carrier.

In one or more embodiments of the present invention, a portable carrier for reusable grocery-style bags may be attached to a basket, cart, or other attachment point by a carrying handle or a carabiner.

In one or more embodiments of the present invention, a portable carrier for reusable grocery-style bags includes a dispensing port that provides easy access to one or more reusable grocery-style bags.

In one or more embodiments of the present invention, a portable carrier for reusable grocery-style bags allows for the insertion of reusable bags through the loading port and the removal of reusable bags through the dispensing port.

In one or more embodiments of the present invention, a portable carrier for reusable grocery-style bags provides an entire shopping trip worth of reusable grocery-style bags in a single compact container that is easy to load, unload, and reload. The portable carrier may easily be stored under a car seat or in a car trunk.

In one or more embodiments of the present invention, a portable carrier for reusable grocery-style bags may be used in any application in which reusable grocery-style bags may be used.

In one or more embodiments of the present invention, a portable carrier for reusable grocery-style bags facilitates long-term storage of reusable grocery-style bags when not in use.

In one or more embodiments of the present invention, a portable carrier for reusable grocery-style bags is more convenient than conventional methods of carrying reusable grocery-style bags.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A portable carrier for reusable grocery-style bags comprising:
    a flexible sleeve substantially cylindrical in shape comprising a hollow cavity;
    a loading port disposed on a first distal end of the sleeve providing distal access to the cavity, the loading port comprising:
        a flexible fabric,
        a fabric gusset,
        a cord fabric loop,
        a cord loop partially disposed within the cord fabric loop with a remaining portion of the cord loop configured to serve as a carrying handle, and
        a cord lock disposed around the cord loop,
        wherein the loading port is configured to load crumpled reusable grocery-style bags;
    a back portion closing a second distal end of the sleeve;
    a dispensing port disposed along a length of the sleeve providing access to the cavity, wherein the dispensing port is configured to dispense one or more reusable grocery-style bags;
    a carabiner fabric loop disposed on the sleeve; and
    a carabiner attached to the carabiner fabric loop.

2. The portable carrier of claim 1, further comprising:
    a fabric loop disposed on the second distal end of the sleeve.

3. The portable carrier of claim 1, wherein the loading port is configured to load a plurality of reusable bags into the cavity of the sleeve.

4. The portable carrier of claim 1, wherein the cavity of the sleeve is configured to store a plurality of reusable bags.

5. The portable carrier of claim 1, wherein the dispensing port is configured to provide access to one or more reusable bags from the cavity of the sleeve.

6. The portable carrier of claim 1, wherein the sleeve is polygon shaped.

7. The portable carrier of claim 1, wherein the sleeve comprises fabric.

8. The portable carrier of claim 1, wherein the sleeve comprises leather.

9. The portable carrier of claim 1, wherein the sleeve comprises silicone.

10. The portable carrier of claim 1, wherein the loading port comprises:
a zippered closure to the first distal end of the sleeve.

11. The portable carrier of claim 1, wherein the loading port comprises:
a hook-and-loop closure to the first distal end of the sleeve.

12. The portable carrier of claim 1, wherein the loading port comprises:
a button closure to the first distal end of the sleeve.

13. The portable carrier of claim 1, wherein the cord loop is configured to serve as a carrying handle.

14. The portable carrier of claim 1, wherein the loading port further comprises:
a fabric gusset.

15. The portable carrier of claim 1, wherein the dispensing port comprises:
a zipper disposed along a length of the sleeve;
a slider disposed on the zipper; and
a pull tab disposed on the slider.

16. The portable carrier of claim 1, wherein the dispensing port comprises:
a hook-and-loop fastener disposed along a length of the sleeve.

17. The portable carrier of claim 1, wherein the dispensing port comprises:
a button fastener disposed along a length of the sleeve.

* * * * *